(12) United States Patent
Park et al.

(10) Patent No.: US 11,258,312 B2
(45) Date of Patent: Feb. 22, 2022

(54) SYSTEMS AND METHODS FOR WIRELESS CHARGING

(71) Applicant: Bigmotion Technologies Inc., Surrey (CA)

(72) Inventors: Jung Wook Park, Surrey (CA); Yaser Mohammadian Roshan, Vancouver (CA)

(73) Assignee: BigMotion Technologies Inc., Surrey (CA)

( * ) Notice: Subject to any disclaimer, the term of this patent is extended or adjusted under 35 U.S.C. 154(b) by 265 days.

(21) Appl. No.: 16/324,294

(22) PCT Filed: Aug. 8, 2017

(86) PCT No.: PCT/CA2017/050937
§ 371 (c)(1),
(2) Date: Feb. 8, 2019

(87) PCT Pub. No.: WO2018/027313
PCT Pub. Date: Feb. 15, 2018

(65) Prior Publication Data
US 2019/0173327 A1  Jun. 6, 2019

Related U.S. Application Data

(60) Provisional application No. 62/372,150, filed on Aug. 8, 2016.

(51) Int. Cl.
*H02J 50/90* (2016.01)
*H02J 50/80* (2016.01)
(Continued)

(52) U.S. Cl.
CPC .............. *H02J 50/90* (2016.02); *H02J 7/025* (2013.01); *H02J 50/12* (2016.02); *H02J 50/40* (2016.02); *H02J 50/80* (2016.02)

(58) Field of Classification Search
CPC ....................................................... H02J 50/90
(Continued)

(56) References Cited

U.S. PATENT DOCUMENTS 9,231,665 B2 *  1/2016  Liao ........................ H02J 50/50
9,660,703 B1 *  5/2017  Knoedgen ........... H02J 7/00712
(Continued)

OTHER PUBLICATIONS

International Search Report and Written Opinion for PCT/CA2017/050937, International Searching Authority, dated Nov. 14, 2017.

*Primary Examiner* — Jerry D Robbins
(74) *Attorney, Agent, or Firm* — Norton Rose Fulbright Canada LLP; Maya Medeiros

(57) ABSTRACT

A wireless charging system comprises at least one wireless power transmitter at a fixed location, at least two wireless communication beacons in proximity and at known locations relative to the wireless power transmitter, and a portable electronic device in proximity to the wireless power transmitter. The portable electronic device comprises a wireless power receiver connected to charge a battery through a tunable power electronic circuit, a wireless communication receiver, a 3-axis accelerometer, a 3-axis magnetometer, a 3-axis gyroscope, and a controller configured to determine the position and orientation of the wireless power receiver with respect to the wireless power transmitter and tune the tunable power electronic circuit based on the determined orientation.

18 Claims, 5 Drawing Sheets

(51) Int. Cl.
  *H02J 50/12* (2016.01)
  *H02J 50/40* (2016.01)
  *H02J 7/02* (2016.01)

(58) Field of Classification Search
  USPC .......................................................... 320/108
  See application file for complete search history.

(56) References Cited

U.S. PATENT DOCUMENTS

| | | | | |
|---|---|---|---|---|
| 9,785,254 | B2* | 10/2017 | Kulik | G01C 17/38 |
| 10,055,126 | B2* | 8/2018 | Quinn | G06F 3/0653 |
| 10,117,204 | B2* | 10/2018 | Greenberg | H04L 1/08 |
| 10,250,063 | B2* | 4/2019 | Woo | H02J 50/40 |
| 10,484,847 | B2* | 11/2019 | Todeschini | H04W 4/025 |
| 2010/0109445 | A1* | 5/2010 | Kurs | B60L 53/122 |
| | | | | 307/104 |
| 2010/0145236 | A1* | 6/2010 | Greenberg | G04G 21/025 |
| | | | | 600/595 |
| 2013/0119927 | A1* | 5/2013 | Partovi | B60L 53/124 |
| | | | | 320/108 |
| 2013/0231068 | A1* | 9/2013 | Veluppillai | H01Q 1/242 |
| | | | | 455/77 |
| 2014/0266160 | A1* | 9/2014 | Coza | G01V 3/08 |
| | | | | 324/207.11 |
| 2015/0079942 | A1* | 3/2015 | Kostka | G06Q 30/0267 |
| | | | | 455/411 |
| 2015/0091389 | A1 | 4/2015 | Byrne et al. | |
| 2016/0006291 | A1* | 1/2016 | Li | H02J 50/12 |
| | | | | 320/108 |
| 2016/0062319 | A1* | 3/2016 | Kim | H02J 7/025 |
| | | | | 368/204 |
| 2016/0072338 | A1 | 3/2016 | Makwinski et al. | |
| 2016/0118179 | A1 | 4/2016 | Park et al. | |
| 2016/0150362 | A1* | 5/2016 | Shaprio | H04W 4/023 |
| | | | | 340/539.13 |
| 2016/0190854 | A1* | 6/2016 | Woo | H02J 50/40 |
| | | | | 320/108 |
| 2016/0324442 | A1* | 11/2016 | Zdeblick | A61B 5/073 |

* cited by examiner

SYSTEMS AND METHODS FOR WIRELESS CHARGING

CROSS REFERENCE TO RELATED APPLICATION

This application claims the benefit of priority of U.S. Provisional Patent Application No. 62/372,150 filed on Aug. 8, 2016, which is hereby incorporated herein by reference in its entirety.

TECHNICAL FIELD

The present invention relates generally to wireless power transfer. More specifically, the present disclosure provides systems and methods for wirelessly charging portable electronic devices.

BACKGROUND

Electronic devices require electrical power to operate. Mobile wearable devices such as 'smart' wristband sensor systems and watches typically include a rechargeable battery that is recharged when the device is plugged into a power socket. Rechargeable batteries must be charged regularly to maintain battery life because rechargeable batteries discharge even when not used. The users of these devices often suffer due to inaccessibility of electrical power for battery charging.

Near field power delivery has been known for many years. Nikola Tesla first experimented with such power delivery many years ago, although his solutions were not viable for various reasons. Near field power delivery typically exploits magnetically coupled resonance, which allows two objects resonating at the same frequency to exchange energy with moderate efficiency. The frequency of such near field resonance may be much lower than wireless communication frequencies, e.g., 10 MHz for near field resonances compared to 2 GHz for wireless communications.

One of the major limitations of the magnetic resonance wireless power transfer systems is their sensitivity to misalignments. Misalignments between the transmitter and receiver coils adversely affect the power transfer efficiency of such systems.

The inventors have determined a need for improved methods and systems for wireless charging.

SUMMARY

One aspect of the present disclosure provides a wireless charging system comprising at least one wireless power transmitter at a fixed location, at least two wireless communication beacons in proximity and at known locations relative to the wireless power transmitter, and a portable electronic device in proximity to the wireless power transmitter. The portable electronic device comprises a wireless power receiver connected to charge a battery through a tunable power electronic circuit, a wireless communication receiver, a 3-axis accelerometer, a 3-axis magnetometer, a 3-axis gyroscope, and a controller configured to determine a position and orientation of the wireless power receiver with respect to the wireless power transmitter and tune the tunable power electronic circuit based on the determined position and orientation.

Another aspect of the present disclosure provides a method for wirelessly charging a portable electronic device. The method comprises providing a wireless power transmitter at a fixed location; providing a wireless power receiver in the portable electronic device; determining a relative position and orientation of the wireless power receiver in relation to the wireless power transmitter; determining a mutual inductance between the wireless power receiver and the wireless power transmitter based on the relative position and orientation; determining a desired resistance of a power electronic circuit connected to the wireless power receiver based on the mutual inductance; and adjusting an effective resistance of the power electronic circuit to match the desired resistance.

Further aspects and details of example embodiments are set forth below.

DRAWINGS

The following figures set forth embodiments in which like reference numerals denote like parts. Embodiments are illustrated by way of example and not by way of limitation in the accompanying figures.

Figure 4:
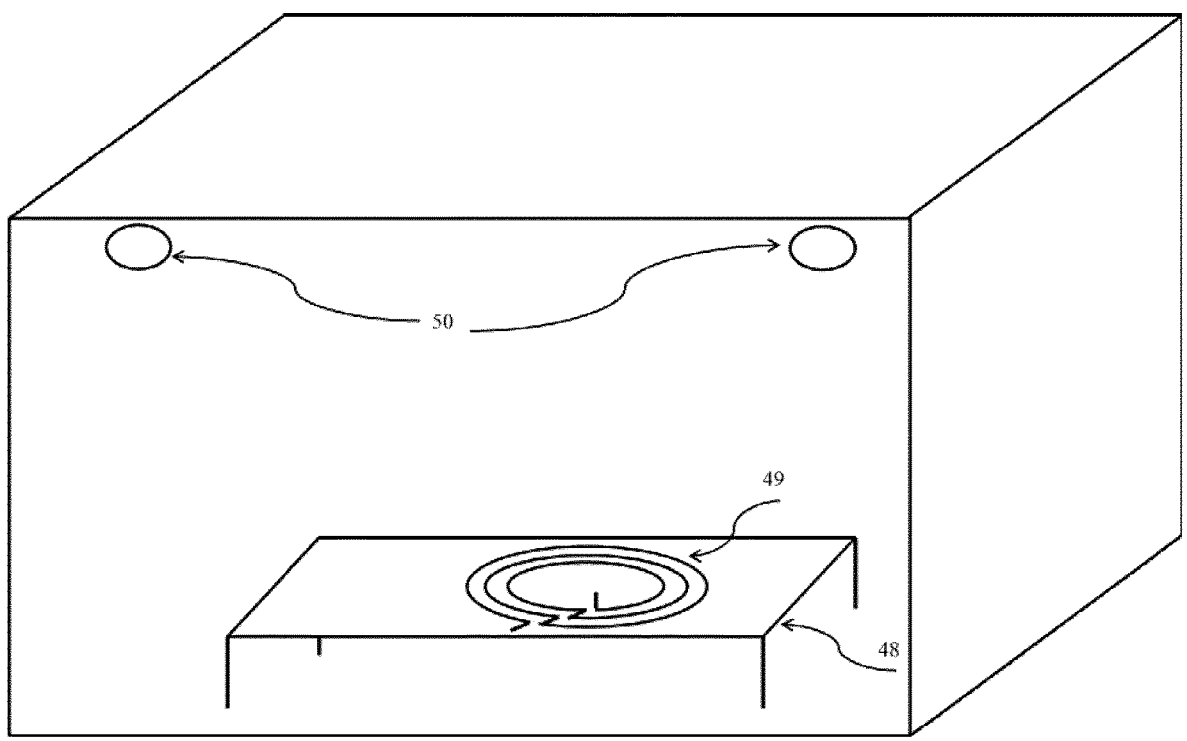

FIG. 4 schematically illustrates a transmitter device and wireless beacons of an example wireless charging system.

Figure 5:
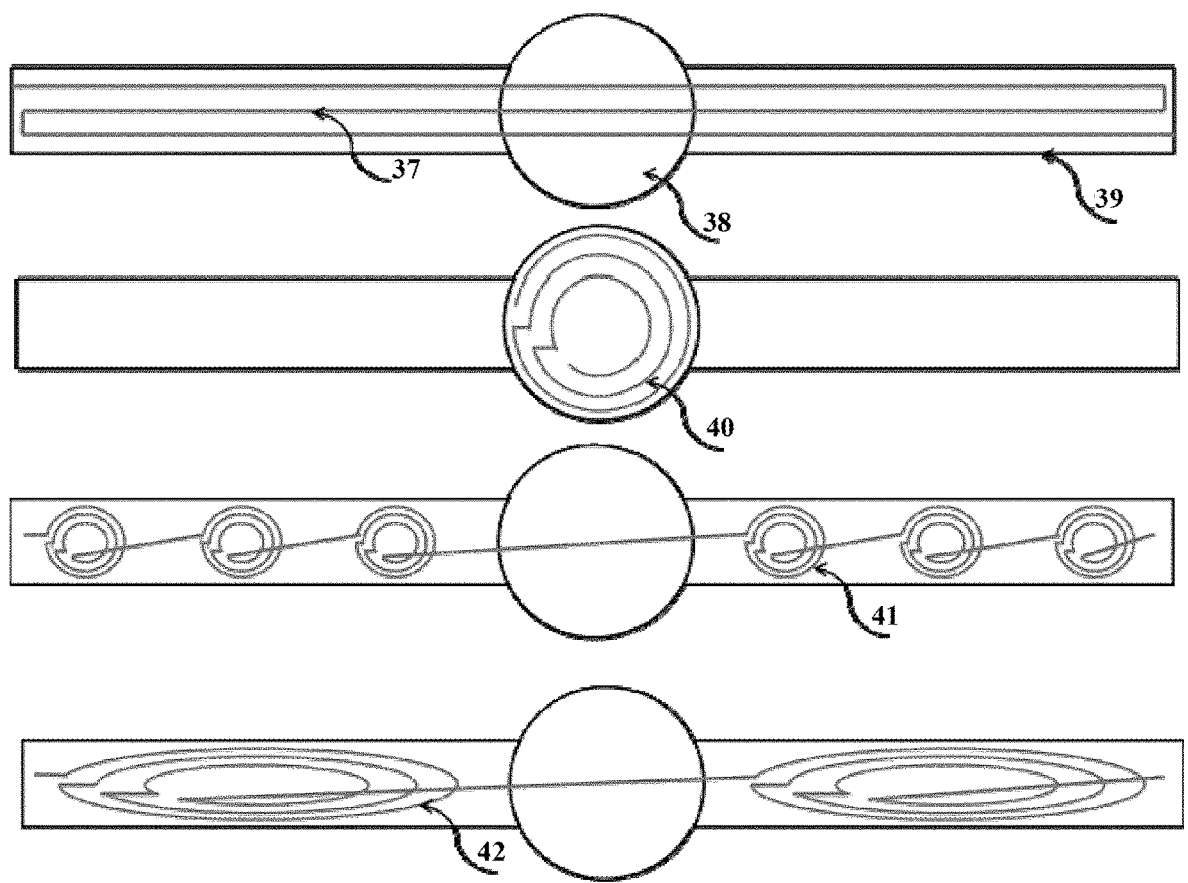

FIG. 5 shows example locations and configurations for placement of receiver coils in wristband devices.

Figure 6:
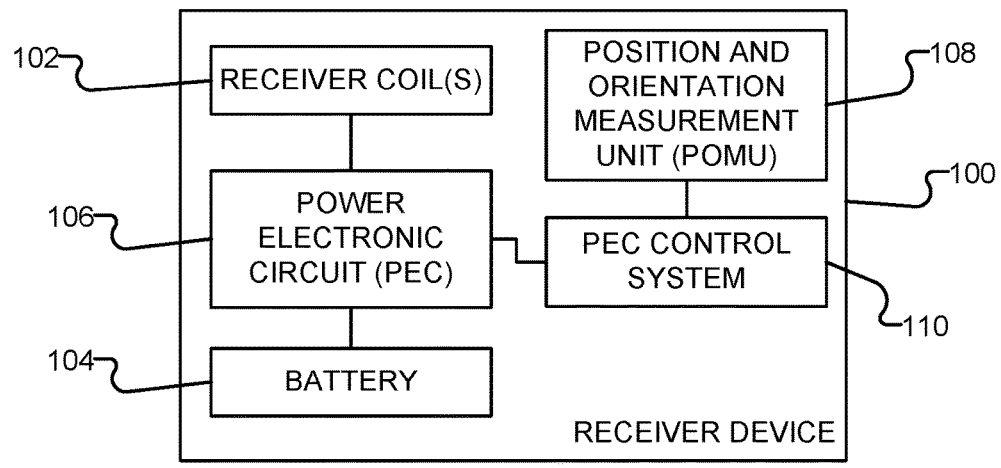

FIG. 6 is a block diagram of an example receiver device.

Figure 7:
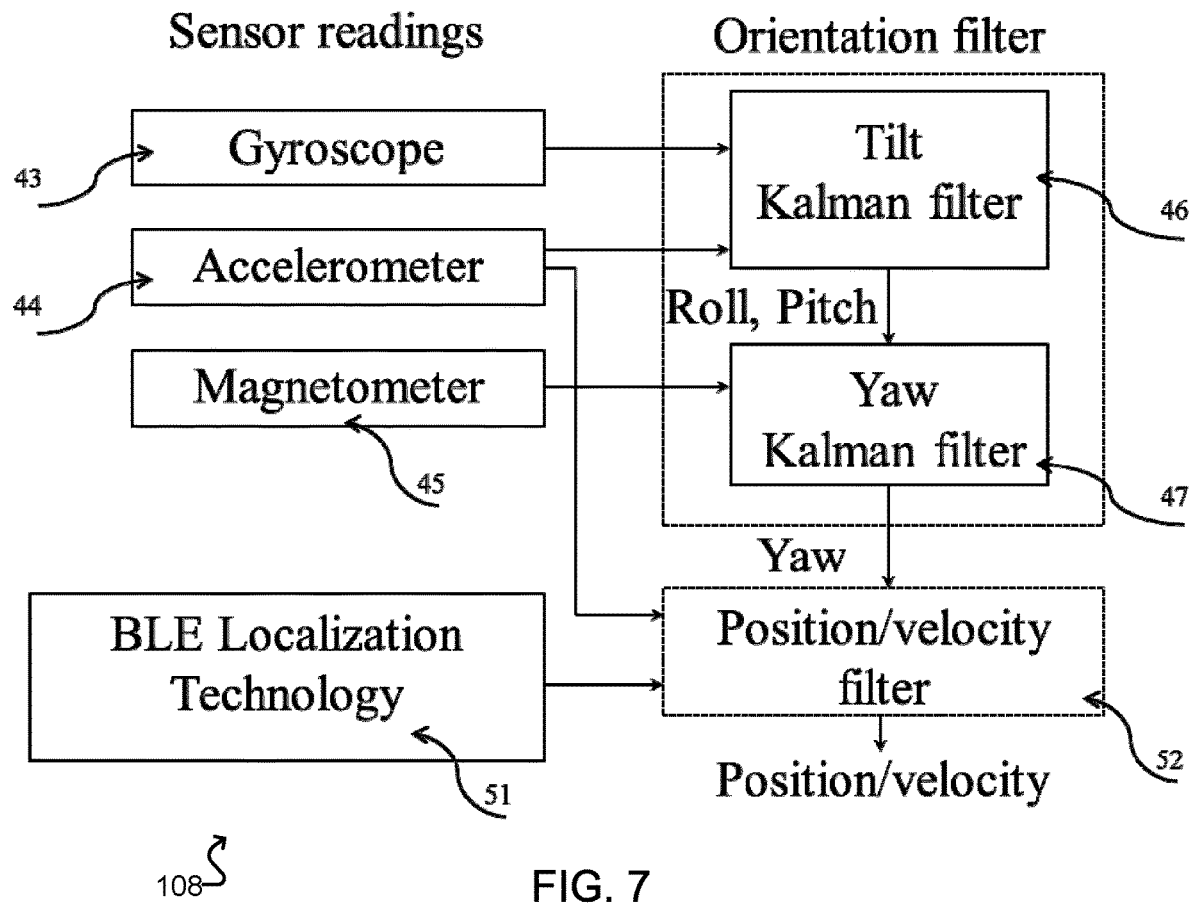

FIG. 7 is a block diagram of an example receiver device measuring orientation (roll, pitch, yaw) and position.

Figure 8:
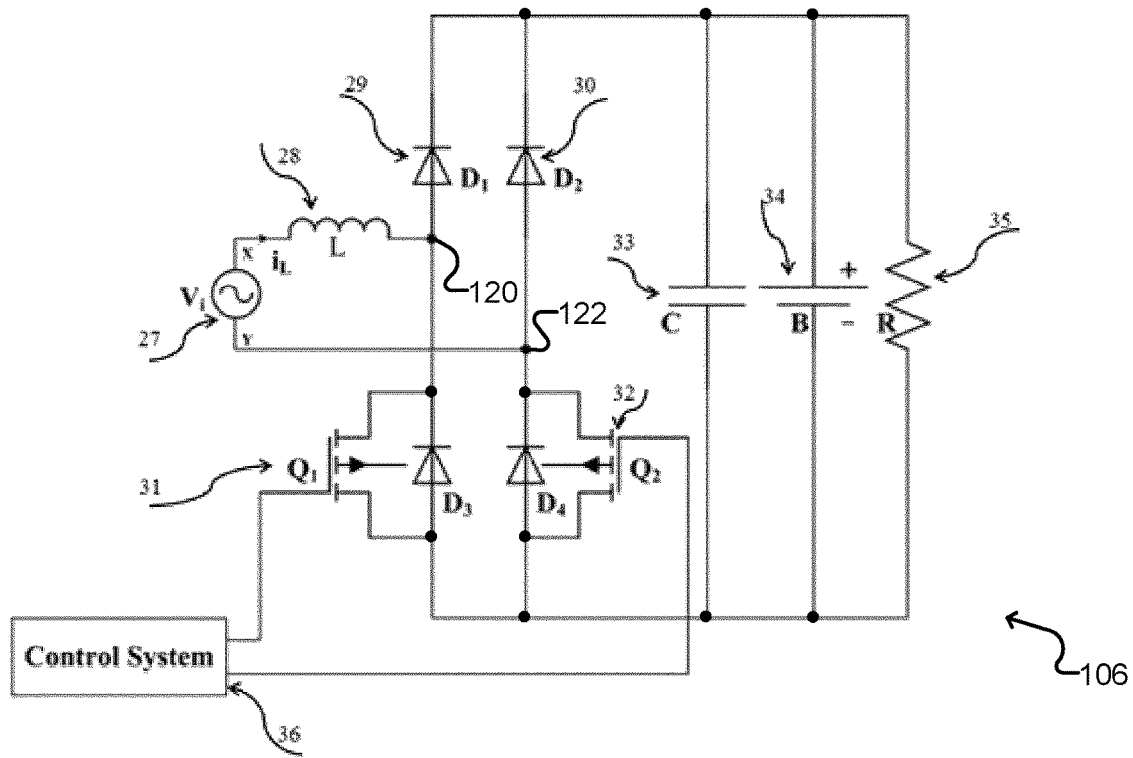

FIG. 8 shows a power electronic circuit of an example receiver device.

Figure 9:
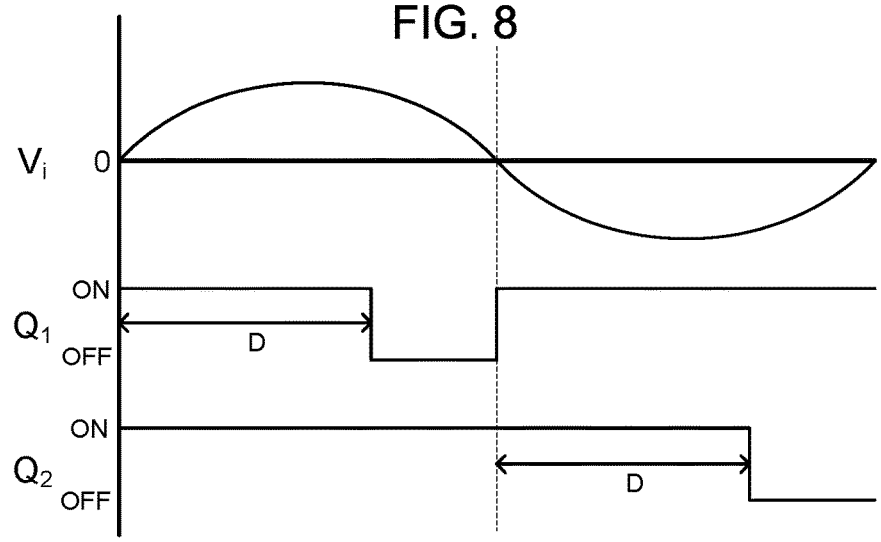

FIG. 9 is a timing diagram showing example timings of an input voltage received at a receiver device and pulse width modulated (PWM) signals applied to the power electronic circuit of the receiver device.

Figure 10:
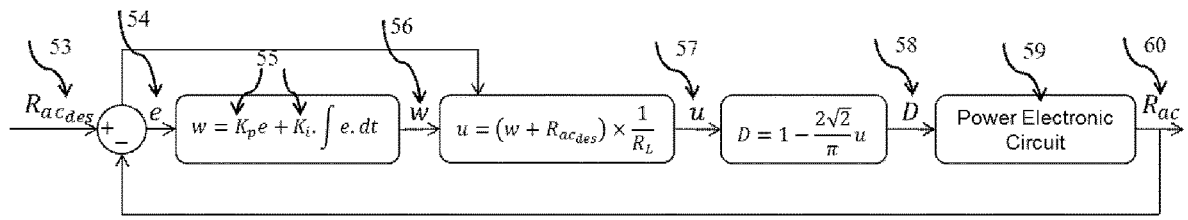

FIG. 10 is a flowchart showing steps of an example method for controlling a power electronic circuit of a receiver device.

DETAILED DESCRIPTION

For simplicity and clarity of illustration, reference numerals may be repeated among the figures to indicate corresponding or analogous elements. Numerous details are set forth to provide an understanding of the examples described herein. The examples may be practiced without these details. In other instances, well-known methods, procedures, and components are not described in detail to avoid obscuring the examples described. The description is not to be considered as limited to the scope of the examples described herein.

Portable electronic devices operate on power supplied by batteries. The amount of power drawn by the electronic circuits in these devices determines battery life. Depending on the level of usage of these devices, their batteries need to be recharged more or less often to keep the devices operational. For the operational continuity of these devices, wireless charging systems can be utilized. Most of the available techniques for wireless power transfer suffer from efficiency issues due to misalignment of transmitter and receiver coils. Embodiments of the present invention address these limitations by providing wireless charging systems and methods that adapt to changing alignments in real time. For example, some embodiments determine the mutual inductance of the system in real time and to update the operation of a power electronic circuit based on the mutual inductance. Embodiments of the present invention provide for automatic identification and adaptation to changing mutual inductance in combination with power electronic circuitry configured to maximize the efficiency of power transfer.

Figure 1:
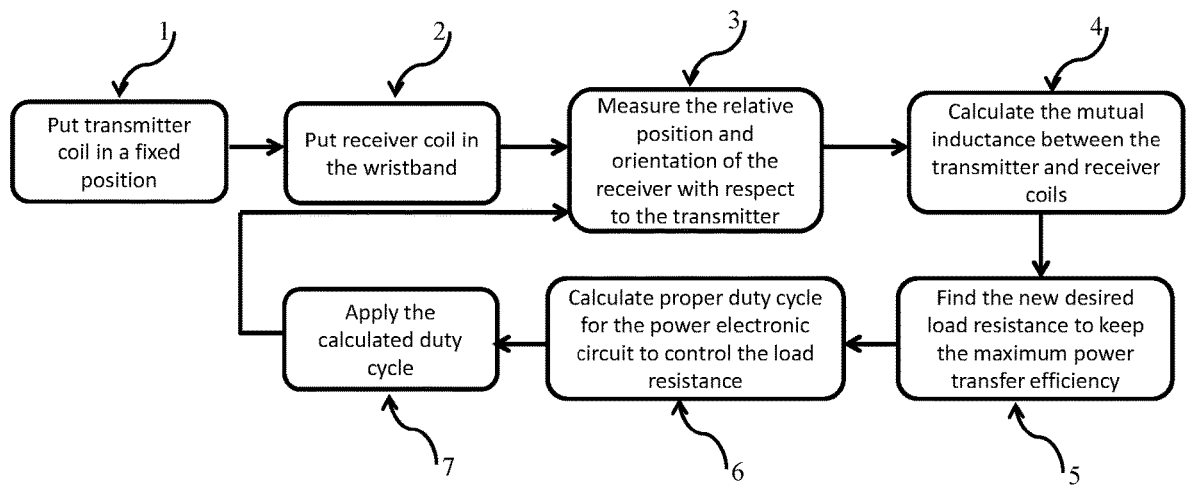
FIG. 1 is a flowchart showing steps of an example method for optimizing the power transfer efficiency of wireless charging.

FIG. 1 shows an example method for optimizing power transfer efficiency in the wireless charging of a portable electronic device. Briefly, the method comprises positioning a wireless charger device with a power transmitter coil at a fixed location (step 1), and providing a power receiver coil (step 2) in a portable electronic device. In the illustrated example the portable electronic device is a wristband device, although the method of FIG. 1 could be used to charge any device with a suitable power receiver coil. The position and orientation of the receiver coil in relation to the transmitter coil are determined (step 3), and the resulting mutual inductance is calculated (step 4). Based on the mutual inductance, a controller determines a desired load resistance (step 5) for a power electronic circuit connected to the receiver coil of the wristband device and a duty cycle (step 6) for control signals, which are applied (step 7) to the power electronic circuit to achieve optimal power transfer efficiency. After step 7, the method returns to step 3 to loop through steps 3-7 such that optimal power transfer efficiency is maintained as the relative position and orientation of the receiver coil changes. Details of example implementations of the steps shown in FIG. 1 are described below, after a brief discussion of an example wireless charging system and the naming conventions used in the present disclosure.

Figure 2:
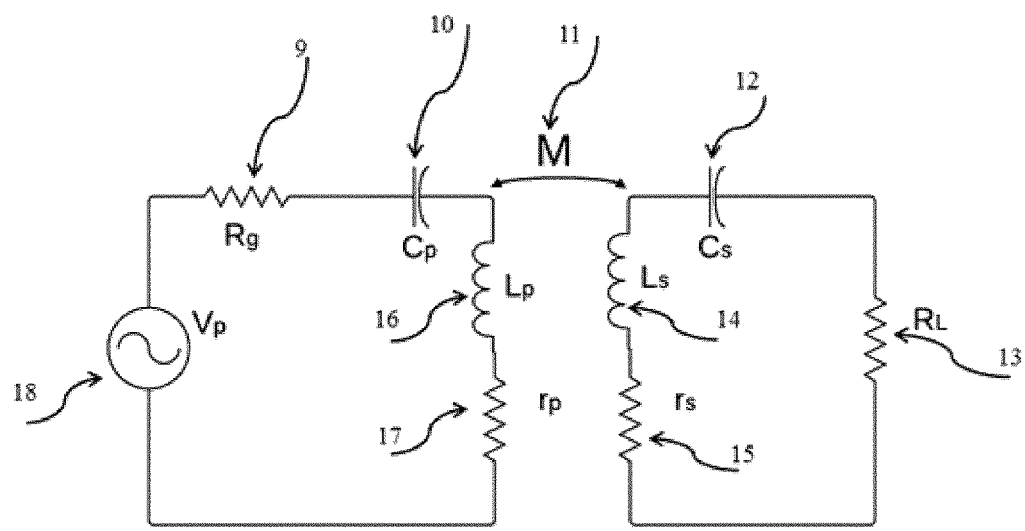
FIG. 2 is a circuit model showing transmitter and receiver coils of a resonance-based wireless power transfer system.
Figure 3:
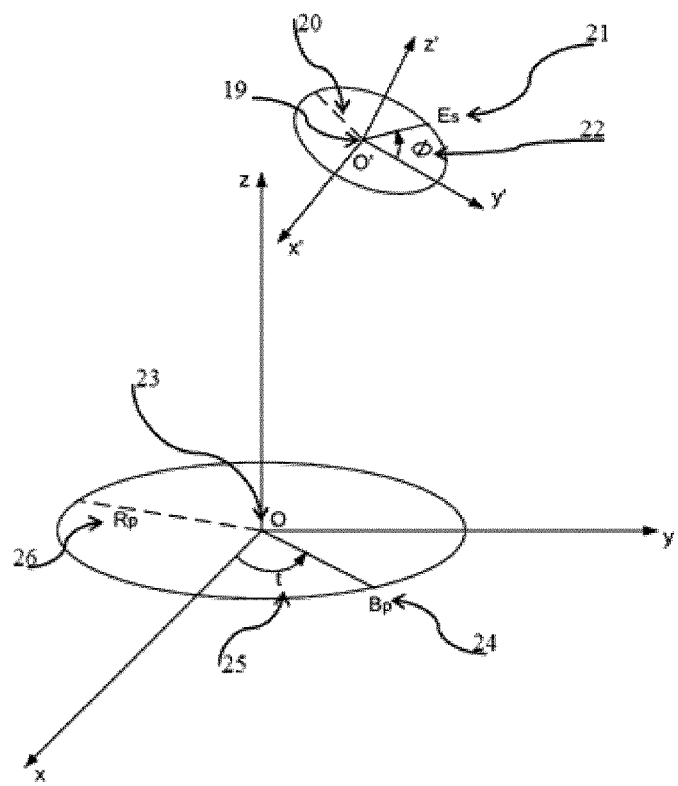
FIG. 3 shows naming conventions for parameters defining the relative position and orientation of transmitter and receiver coils of a wireless charging system.

FIG. 2 schematically illustrates the transmitter and receiver coils of a wireless charging system and their associated circuits. In FIG. 3, $V_p$ 18 is the input power supply providing energy to the charging system and $R_g$ 9 is its internal resistance. $L_p$ 16 and $L_s$ 14 are the transmitter and receiver inductances, $C_p$ 10 and $C_s$ 12 are their capacitances, and $r_p$ 17 and $r_s$ 15 are their internal resistances, respectively. $R_L$ 13 is the load resistance (replacing the battery charger system in the model) and M 11 is the mutual inductance of the transmitter and receiver coils. The mutual inductance M 11 is variable depending on the relative position and orientation of the coils.

FIG. 3 demonstrates the naming convention for different parameters of the coils. In FIG. 3, O 23 and O' 19 are the centers of the transmitter and receiver coils, respectively. $R_p$ 26 and the dashed line 20 ($R_s$) are the radii of the transmitter and receiver coils, respectively. $B_p$ 24 and $E_s$ 21 are arbitrary points on the transmitter coils at angles of t 25 and $\phi$ 22 from the y and y' axes. The relative position and orientation of the coils in FIG. 3, is the displacement of O' 19 with respect to O 23 in the Cartesian frame of x-y-z, as well as the rotation of the Cartesian frame x'-y'-z'; with respect to the cartesian frame x-y-z, respectively.

Step 1:

A transmitter coil 49 is placed in a fixed position, such as for example within a bed 48 as shown in FIG. 4. The transmitter coil 49 is commonly connected to a power supply generating enough power to be wirelessly transferred to a receiver coil of a portable electronic device. In some embodiments, the transmitter coil 49 may be configured to wirelessly transfer power to a plurality of electronic devices, and in such implementations is connected to a power supply and configured to generate enough power to be wirelessly transferred to the plurality of electronic devices.

The transmitter coil 49 is usually larger in size than the receiver coil(s). The transmitter coil 49 is preferably placed in a location in which one or more receiver coils will be in the vicinity of for a considerable amount of time. For example, if a user (e.g., the wearer of the receiver coil in the form of a wristband) is sleeping on a bed 48, the placement of the transmitter coil 49 on the bed 48 is a viable approach to fix the position of the transmitter coil 49 such that maximum power transfer can be achieved. Another viable option could be positioning the transmitter coil 49 on a chair in which the wearer of a receiver device is spending much time on during the day. Overall, the position of the transmitter 49 could include all the places that it can be easily installed and maximum power transfer can be achieved efficiently. At least two wireless communication beacons 50 are positioned at known locations in proximity to the transmitter coil 49, for determining the position of a receiver coil as described below.

Step 2:

A power receiver coil is provided in an electronic device, such as for example a wristband device, along with proper power electronic circuits integrated to a battery charger circuit for the receiver device. FIG. 5 shows some example placements of receiver coils within an example receiver device in the form of a wristband device comprising a display screen 38 and a strap 39. In one example, coil wires 37 are installed to extend along the length of the strap 39. In another example, coil wires 40 are wires installed on the back of the screen 38. Coil wires 41 and 42 demonstrate different example placements of the coil in the strap 39 of the wristband, with different shapes and sizes of the coils. Electronic devices that implement systems and methods according to the present disclosure can have any of the power receiver coil shapes and placements shown in FIG. 5 or any combinations of them. In some embodiments, the shape and placement of a receiver coil with an electronic device may be selected based on characteristics of the transmitter coil to maximize the flow of magnetic field inside the coils throughout a range of relative positions and orientations of the transmitter and receiver coils. An example receiver device 100, as shown in FIG. 6, comprises one or more receiver coils 102 connected to charge a battery 104 though a power electronic circuit (PEC) 106. A position and orientation measurement unit (POMU) 108 provides signals indicating the relative position and orientation of the receiver coil 102 with respect to a transmitter coil to a PEC controller 110. The energy transferred wirelessly to the receiver coil is stored in the battery.

Step 3:

In the third step 3 of the method of FIG. 1, the relative position and orientation of a receiver coil with respect to the transmitter coil 49 (which is at a fixed location) is determined. Determination of the relative position and orientation of the receiver coil may, for example, be accomplished by a measurement unit 108. FIG. 7 shows elements of an example POMU 108, which comprises a 3-axis Gyroscope 43, a 3-axis Accelerometer 44, and a 3-axis Magnetometer 45 installed on a wristband and configured to generate signals based on motion measurements. The signals from these sensors are provided to orientation filters comprising two cascaded liner Kalman Filters (KF): a tilt KF 46 and a yaw KF 47. The orientation of the sensor frame (e.g. the coordinate frame attached to the 3 sensors on wristband) with respect to a reference frame (e.g. the coordinate frame fixed to the transmitter coil for which X and Y axis are in the horizontal plane of motion and Z is orthogonal to the X-Y plane) can be represented by a rotation matrix, which maps a vector's rotation from the sensor frame to the reference frame:

$$x^r = {}_s^r R\, x^s \quad (1)$$

where x is an arbitrary 3×1 vector and the superscripts r and s represent the reference and sensor frames, respectively. ${}_s^r R$ is the 3×3 rotation matrix from the sensor frame to the reference frame. Using the conventional Z-Y-X Euler angles, the rotation matrix is expressed as:

$$
{}_s^r R = \begin{bmatrix} C\alpha C\beta & C\alpha S\beta S\gamma - S\alpha C\gamma & C\alpha S\beta C\gamma + S\alpha S\gamma \\ S\alpha C\beta & S\alpha S\beta S\gamma + C\alpha C\gamma & S\alpha S\beta C\gamma - C\alpha S\gamma \\ -S\beta & C\beta S\gamma & C\beta C\gamma \end{bmatrix} \quad (2)
$$

where C and S are abbreviations for Cos and Sin, respectively; and $\alpha$ (yaw), $\beta$ (pitch) and $\gamma$ (roll) are the rotation angles about the Z-, Y-, and X-axes, respectively. Note that the last row of the rotation matrix is the unit gravity vector expressed in the sensor frame, independent from the yaw angle. By estimating this row, the roll and pitch (e.g. the tilt) angles can be determined as follows:

$$\gamma = \tan^{-1}\left(\frac{{}_s^r R_{3,2}}{{}_s^r R_{3,3}}\right),\ \beta = \tan^{-1}\left(\frac{-{}_s^r R_{3,1}}{{}_s^r R_{3,2}/\sin\gamma}\right) \quad (3)$$

where ${}_s^r R_{i,j}$ represents the $i^{th}$ row and $j^{th}$ column in the rotation matrix ${}_s^r R$. Additionally, by estimating the first row in the rotation matrix and using the tilt angles, the yaw angle ($\alpha$) can be readily determined by:

$$\alpha = \tan^{-1}\left(\frac{-c\gamma\, {}_s^r R_{1,2} + s\gamma\, {}_s^r R_{1,3}}{{}_s^r R_{1,1}/c\beta}\right) \quad (4)$$

As illustrated in FIG. 7, in the tilt KF 46, the gyroscope 43 and accelerometer 44 signals are used along with an acceleration model to estimate the last row of the rotation matrix in order to calculate the tilt angles. In the yaw KF 47, signals from the gyroscope 43 and the magnetometer 45 are used along with the estimated tilt angles from the tilt KF 46 to accurately estimate the first row of the rotation matrix in determining the yaw angle. This yaw KF 47 has the advantage of detecting magnetic disturbances to bridge the temporary disturbances that frequently happen in an indoor environment.

The output from the orientation filters 46, 47 is provided to a position/velocity filter 52. The position/velocity filter 52 determines the relative position of the receiver coil based on location information obtained using a wireless communication transmitter configured to communicate with the wireless communication beacons 50 near the transmitter coil 49. In the illustrated example, the beacons 50 comprises Bluetooth™ Low Energy (BLE) beacons 50, but it is to be understood that different wireless communication protocols may be employed. The position of the wristband with respect to the transmitter coil 49 can be determined by measuring the received signal strengths from the two BLE beacons 50 and applying trilateration to estimate the wristband position. This procedure is carried out by the BLE localization technology 51 and position/velocity filter 52 of the example OMU 108 shown in FIG. 7, and is described briefly below.

The wireless communication channel experiences small-scale fading and large-scale fading. The small-scale fading effects can be averaged out, leaving the large scale fading. The large scale fading consists of a deterministic part (path loss) and a random part (shadowing). The received power measured at the wristband, $P_r$, gets attenuated by a deterministic quantity, known as the path loss, $P_L(d)$, that is a function of the separation distance between the transmitter (e.g. BLE beacons) and the receiver (e.g. the wristband). The expression for Path loss in dB is given by:

$$P_L(d) = P_L(d_0) + 10\epsilon\log\frac{d}{d_0} \quad (5)$$

where $\epsilon$ is the path loss exponent, which depends on the environment in which the transmitter and receiver are located, and typically ranges from 3-6.

Empirical and theoretical evidence suggests that received power P is given by:

$$P_r = 10\epsilon\log\frac{d}{d_0} + N(0, \sigma_{sh}^2) \quad (6)$$

where N is a normal distribution with zero mean and variance, $\sigma_{sh}^2$ typically equals to 3 for indoor environments.

The distance, d is given by:

$$d = \sqrt{(X_r - X_{T,k})^2 + (Y_r - Y_{T,k})^2},\ k=1,\ldots,N \quad (7)$$

where $(X_r, Y_r)$ is the receiver/wristband 2D position, N is the total number of BLE beacons, and $(X_T, Y_T)$ is the BLE beacon 2D position. By measuring the received power at the wristband from at least two BLE beacons 50, the distance d can be estimated using the method of least squares to solve for $(X_r, Y_r)$. Using the trilateration technique and the distance d the relative position can be calculated and used in the next step.

Step 4:

The mutual inductance between the wireless power transmitter and receiver coils $M_t$ is calculated based on their relative position and orientation. The relative position is provided by the output of the position/velocity filter 52 and the relative orientation is provided by the output of the orientation filters 46, 47.

Using the naming conventions discussed above with reference to FIG. 3, the mutual inductance between the coils $M_t$ can be determined as:

$$M_t = \sum_{i=1}^{i=N_P} \sum_{j=1}^{j=N_S} M_{ij} \quad (8)$$

where $N_p$ and $N_s$ are the number of turns in the transmitter and the receiver coils and $M_{ij}$ can be found from the following relationship:

$$M_{ij} = \frac{\mu_0}{\pi}\sqrt{R_{P_i} R_{S_j}} \int_0^{2\pi} \frac{\left[\cos(\theta)\cos(\gamma) + \frac{y_1}{R_{S_j}}(\cos(\gamma)\cos(\phi)) - \frac{x_1}{R_{S_j}}(\sin(\theta)\sin(\gamma)\cos(\phi) + \cos(\theta)\sin(\phi))\right]\Psi(k)}{k\sqrt{V^3}} d\phi \quad (9)$$

In equation (9), $R_{p_i}$, $R_{s_j}$, V, k and $\Psi$ are defined as set out in equations (10), (11), (12), (13) and (18) below. Also $\mu_0$ is the magnetic permeability of vacuum ($4\pi \times 10^{-7}$), $x_1$ and $y_1$ are the translation of the receiver Cartesian frame in the x and y direction of the transmitter Cartesian frame (FIG. 4), and $\theta$ and $\gamma$ are the rotation of the receiver Cartesian frame around the x and y axes of the transmitter Cartesian frame.

The parameters $R_{p_i}$ and $R_{s_j}$ in equation (9) are defined as:

$$R_{p_i} = r_{out_p} - (i-1)(w_p + s_p) - \frac{w_p}{2} \quad (10)$$

$$R_{s_j} = r_{out_s} - (j-1)(w_s + s_s) - \frac{w_s}{2} \quad (11)$$

where $r_{out_p}$ and $r_{out_s}$ denote the outer radii of the transmitter and receiver coils, respectively, while $w_p$ and $w_s$ are the track widths and $s_p$ and $s_s$ are the track separations of multi turn coils.

The parameter V in equation (9) is defined as:

$$V = \left[ \frac{x_1^2}{R_s^2} + \frac{y_1^2}{R_s^2} + [\cos(\gamma)^2 + \sin(\theta)^2 \sin(\gamma)^2]\sin(\phi)^2 + \cos(\theta)^2 \cos(\phi)^2 - \left[ \frac{2x_1}{R_s}\cos(\gamma) + \frac{2y_1}{R_s}\sin(\theta)\sin(\gamma) \right]\sin(\phi) + \frac{2y_1}{R_s}\cos(\theta)\cos(\phi) - [2\sin(\theta)\cos(\theta)\sin(\gamma)]\sin(\phi)\cos(\phi) \right]^{\frac{1}{2}} \quad (12)$$

The parameter k in equation (9) is defined as:

$$k = \sqrt{\frac{2p}{A+p}} \quad (13)$$

where A is defined as:

$A = R_p^2 + (R_s \cos(\gamma)\sin(\phi) - x_1)^2 + (R_s \sin(\theta)\sin(\gamma)\sin(\phi) - R_s \cos(\theta)\cos(\phi) - y_1)^2 + (z_1 - R_s \cos(\theta)\sin(\gamma)\sin(\phi) - R_s \sin(\theta)\cos(\phi))^2$  (14)

where $z_1$ is the translation of the receiver Cartesian frame in the z direction of the transmitter Cartesian frame (FIG. 5). Also, p in equation (13) is defined as:

$$p = B^2 + C^2 \quad (15)$$

where B and C are defined as:

$$B = 2R_p(R_s \cos(\gamma)\sin(\phi) - x_1) \quad (16)$$

$$C = 2R_p(R_s \sin(\theta)\sin(\gamma)\sin(\phi) - R_s \cos(\theta)\cos(\phi) - y_1) \quad (17)$$

The parameter $\psi$ in equation (9) is defined as a function of k as:

$$\Psi(k) = \left(1 - \frac{k^2}{2}\right)K(k) - E(k) \quad (18)$$

where K(k) and E(k) are the complete elliptic integrals of the first and second kind, respectively, and are defined as:

$$K(k) = \int_0^\pi \frac{1}{\sqrt{1 - k^2 \sin(\theta)^2}} d\theta \quad (19)$$

$$E(k) = \int_0^\pi \sqrt{1 - k^2 \sin(\theta)^2} \, d\theta \quad (20)$$

Utilizing the above formulas and Simpson's rule in order to perform the numerical calculation of the integration, the value of the mutual inductance between the coils (M) can be determined. The mutual inductance of the coils will be changing due to changes in the relative position and orientation of the coils with respect to each other.

Step 5:

For the wireless charging system illustrated in FIG. 2 to maintain maximum power transfer efficiency, the following relationship should hold at all times:

$$\frac{R_g}{r_p} = \frac{R_L}{r_s} = \sqrt{1 + U^2} \quad (21)$$

where U is defined as:

$$U = \frac{M\omega}{\sqrt{r_p r_s}} \quad (22)$$

In equation (22), $\omega$ is the frequency of the input power supply 18. The relationship in equation (21) demonstrates that, by changing the value of mutual inductance, M 11, the value of U will change in the system; hence, if left unadjusted, the system would deviates from its maximum power transfer efficiency point. Therefore, a new desired value for the load resistance, $R_L$ 13, can be calculated to ensure the operation of the system remains as close as possible to its maximum power transfer efficiency. The ideal load resistance value $R_{L,des}$ can be calculated using the following:

$$R_{L,des} = r_s \cdot \sqrt{1 + U^2} \quad (23)$$

This value can be utilized to control the power electronic circuit such to maintain the effective resistance across the input terminals of the power electronic circuit as close as possible to this ideal load resistance value $R_{L,des}$.

Step 6:

FIG. 8 shows an example power electronic circuit 108 for converting the AC received signal $V_i$ at the receiver coil (denoted by L 28 in FIG. 8) to a DC signal which can be stored in a battery 34. The battery 34 is connected in parallel with a capacitor 33 having a capacitance C and a load 35 having a resistance R. A diode bridge comprising diodes $D_1$-$D_4$, with diodes $D_1$ and $D_3$ connected in a first leg 29 and diodes $D_2$ and $D_4$ connected in series in a second leg 30, is also connected in parallel across the battery 34. Input terminals 120 and 122 are located between the diodes in legs 29 and 30, respectively. Transistors $Q_1$ 31 and $Q_2$ 32 are connected around diodes $D_3$ and $D_4$, respectively, to bypass the respective diode when the transistor is turned on. The receiver coil is connected to the input terminals 120, 122 of the proposed power electronic circuit. In the illustrated example, the receiver coil is shown as a power supply part 27 and an inductor part 28, modelled by an AC power supply and a simple inductor, respectively.

The power electronic circuit in FIG. 8 works as follows: At the points that the input AC voltage is in its positive cycle, $Q_2$ 32 is always ON and $Q_1$ 31 will be switched ON and OFF by a control system 36 which applies a Pulse Width Modulation (PWM) signal with fixed frequency of ω (the AC signal frequency) and the duty cycle of D. At the points that the input AC voltage is in its negative cycle, $Q_1$ 31 will be always on and $Q_2$ 32 will be switched ON and OFF with the same PWM signal. FIG. 9 shows a timing diagram illustrating the PWM signals applied to $Q_1$ 31 and $Q_2$ 32 in relation to the AC received signal $V_i$. The effective resistance that can be seen from the input terminals 120, 122 of the power electronic circuit, $R_{ac}$, can be calculated as:

$$R_{ac} = \left(\frac{\pi^2}{8}\right)(1-D)^2 \cdot R \tag{24}$$

The desired value of effective resistance $R_{ac}$, e.g. $R_{ac_{des}} = R_{L,des}$, can be used to determine a proper value for the duty cycle D with which the circuit should be operated.

FIG. 10 shows an example system of controlling the duty cycle of a power electronic circuit connected to a power receiver coil of an electronic device. The example system of FIG. 10 is configured to achieve the desired resistive behavior, and is also robust to variations in circuit parameters from ideal or expected values. For example, with reference to the example circuit of FIG. 2, parameters such as the values of $L_p$, $L_s$, $r_s$, $r_p$, $C_p$, and $C_s$ may have some tolerances from their expected values. Also, some of the parameters such as the small resistances $r_s$, and $r_p$, can change with variations in temperature. Accordingly, applying a duty cycle calculated directly from equation (24) using the expected parameter values may lead to an effective resistance that is slightly different from the desired value. Use of control system such as the example illustrated in FIG. 10, which includes feedback of the actual effective resistance $R_{ac}$ of the power electronic circuit, can ensure that the error between the desired and actual values of the effective resistance $R_{ac}$ will eventually get to zero, such that the system can tolerate variations of circuit parameters from their expected values, and the actual resistance seen at the input terminals will eventually reach the desired resistance.

The system of FIG. 10 may be implemented as part of the control system 36 of FIG. 8 or the PEC control system 110 shown in FIG. 6. The input of the control system is the desired value of the resistance 53 (e.g. $R_{ac_{des}}$), which is determined as set out above such that the maximum power transfer efficiency is achieved. The control system measures the actual circuit resistance value 60, and the desired resistance value 53 is subtracted from the actual circuit resistance value 60 to determine an error 54. The error 54 is then fed to a Proportional-Integral (PI) controller with the coefficients of $K_p$ and $K_i$ 55, to determine the value of w 56. The PI controller coefficients 55 are set based on the system parameters. The next two blocks in FIG. 10 implement a nonlinear model-based feedback-linearization control technique to calculate the duty cycle D 58 to ensure the convergence of the system resistance 60 to the desired value 53. The duty cycle 58 will be then fed to the power electronic circuit 59 in step 7 of FIG. 1. The example system proposed in FIG. 10 assures that the error between the desired resistance value 53 and the actual resistance value 60 will eventually converge to zero; hence, the resistance value is controlled. Setting proper controller coefficients 55 will affect the speed of the control system response and other related control parameters (such as overshoot, settling time, etc.).

Step 7:

In step 7, the calculated duty cycle D will be applied to the power electronic circuit, by modifying the PWM signal. FIG. 9 shows a timing diagram illustrating the PWM signal applied to the power electronic circuit in relation to the input AC voltage. This will result in a new operating point for the receiver of the wireless charging system. The new operating point is a response to variation in mutual inductance value and to assure the required condition for operating at maximum power transfer efficiency. After step 7, the method returns to step 3, and loops through steps 3-7 to maintain maximum power transfer efficiency.

In some embodiments, the method comprises periodically updating the determination of the relative position and orientation of a receiver coil with respect to the transmitter coil and re-adjusting the effective resistance of the power electronic circuit. The updates and adjustments can be done at a frequency ranging from very high (depending on the processing speed of the circuits) to relatively low, depending on the situation. For example, in some embodiments the determination of the relative position and orientation of the receiver coil is updated at a frequency selected based on the user's activity. In some embodiments, the determination of the relative position and orientation of the receiver coil is updated at a frequency or once per second (or higher) to once per ten minutes (or longer). In some embodiments, the method comprises continuously updating the determination of the relative position and orientation of a receiver coil with respect to the transmitter coil and re-adjusting the effective resistance of the power electronic circuit when the relative position and orientation changes more than a threshold amount.

The present disclosure may be embodied in other specific forms without departing from its spirit or essential characteristics. The described embodiments are to be considered in all respects only as illustrative and not restrictive.

The invention claimed is:

1. A system for optimizing power transfer efficiency in wireless charging of portable electronic devices, the system comprising:
   at least one wireless power transmitter at a fixed location;
   at least two wireless communication beacons in proximity to and at known locations relative to the wireless power transmitter;
   a portable electronic device in proximity to the wireless power transmitter, the portable electronic device comprising a wireless power receiver connected to charge a battery through a tunable power electronic circuit, a wireless communication receiver, a 3-axis accelerometer, a 3-axis magnetometer, a 3-axis gyroscope, and a controller configured to determine an orientation of the wireless power receiver with respect to the wireless power transmitter and tune the tunable power electronic circuit to optimize power transfer efficiency by applying signals and a duty cycle to the tunable power electronic circuit to adjust an effective resistance of the tunable power electronic circuit, wherein the controller computes the signals and the duty cycle based on the determined orientation.

2. The system of claim 1 wherein the portable electronic device comprises a wristband device.

3. The system of claim 2 wherein the wireless power receiver comprises a receiver coil extending at least partially through a strap of the wristband device.

4. The system of claim 1 wherein the tunable power electronic circuit comprises a diode bridge having four diodes arranged in two series-connected legs of two diodes each, with a transistor connected across one of the diodes in each of the legs, with each leg of the diode bridge having an input terminal between the two diodes connected to the wireless power receiver.

5. The system of claim 4 wherein the controller is connected to measure an effective resistance across the input terminals of the tunable power electronic circuit, apply pulse width modulation (PWM) signals to the transistors of the tunable power electronic circuit, and control a duty cycle of the PWM signals to adjust the effective resistance.

6. The system of claim 1 wherein the wireless power transmitter comprises a transmitter coil having a first diameter and the wireless power receiver comprises a receiver coil having a second diameter smaller than the first diameter.

7. The system of claim 6 wherein the transmitter coil is positioned in a bed.

8. The system of claim 6 wherein the transmitter coil is positioned in a chair.

9. An portable electronic device for optimizing power transfer efficiency in wireless charging, the portable electronic device comprising:
- a battery;
- a wireless power receiver;
- a tunable power electronic circuit connected between the battery and the wireless power receiver;
- a wireless communication receiver;
- a 3-axis accelerometer;
- a 3-axis magnetometer;
- a 3-axis gyroscope; and
- a controller configured to determine an orientation of the wireless power receiver with respect to a wireless power transmitter based on signals from the wireless communication receiver, 3-axis accelerometer, 3-axis magnetometer and 3-axis gyroscope and connected to tune the tunable power electronic circuit to optimize power transfer efficiency by applying signals and a duty cycle to the tunable power electronic circuit to adjust an effective resistance of the tunable power electronic circuit, wherein the controller computes the signals and the duty cycle based on the determined orientation.

10. The portable electronic device of claim 9 wherein the portable electronic device comprises a wristband device and the wireless power receiver comprises a receiver coil extending at least partially through a strap of the wristband device.

11. The portable electronic device of claim 9 wherein the tunable power electronic circuit comprises a diode bridge having four diodes arranged in two series-connected legs of two diodes each, with a transistor connected across one of the diodes in each of the legs, with each leg of the diode bridge having an input terminal between the two diodes connected to the wireless power receiver.

12. The portable electronic device of claim 11 wherein the controller is connected to measure an effective resistance across the input terminals of the tunable power electronic circuit, apply pulse width modulation (PWM) signals to the transistors of the tunable power electronic circuit, and control a duty cycle of the PWM signals to adjust the effective resistance.

13. A method for optimizing power transfer efficiency in wireless charging of a portable electronic device, the method comprising:
- providing a wireless power transmitter at a fixed location;
- providing a wireless power receiver in the portable electronic device;
- determining a relative position and orientation of the wireless power receiver in relation to the wireless power transmitter;
- determining a mutual inductance between the wireless power receiver and the wireless power transmitter based on the relative position and orientation;
- determining a desired resistance of a power electronic circuit connected to the wireless power receiver based on the mutual inductance; and
- adjusting an effective resistance of the power electronic circuit to match the desired resistance to optimize power transfer efficiency by applying signals and a duty cycle to the power electronic circuit.

14. The method of claim 13 wherein determining the relative position and orientation of the wireless power receiver comprises determining the relative orientation by processing gyroscope and accelerometer signals in a first Kalman filter and processing gyroscope, accelerometer and magnetometer signals in a second Kalman filter.

15. The method of claim 13 wherein determining the relative position and orientation of the wireless power receiver comprises determining the relative position based on signals from wireless communication beacons in proximity to and at known locations relative to the wireless power transmitter.

16. The method of claim 13 wherein adjusting the effective resistance of the power electronic circuit comprises applying pulse width modulation (PWM) signals to the power electronic circuit, and controlling a duty cycle of the PWM signals to adjust the effective resistance.

17. The method of claim 13 comprising periodically updating determination of the relative position and orientation of the wireless power receiver and re-adjusting the effective resistance of the power electronic circuit.

18. The method of claim 13 comprising continuously updating determination of the relative position and orientation of the wireless power receiver, and re-adjusting the effective resistance of the power electronic circuit when the relative position and orientation changes more than a threshold amount.

* * * * *